United States Patent [19]

Torgrim

[11] Patent Number: 5,724,420
[45] Date of Patent: Mar. 3, 1998

[54] AUTOMATIC CALL DISTRIBUTION WITH ANSWER MACHINE DETECTION APPARATUS AND METHOD

[75] Inventor: Willard J. Torgrim, Batavia, Ill.

[73] Assignee: Rockwell International Corporation, Costa Mesa, Calif.

[21] Appl. No.: 669,665

[22] Filed: Jun. 24, 1996

Related U.S. Application Data

[63] Continuation of Ser. No. 313,973, Sep. 28, 1994, abandoned.

[51] Int. Cl.$^6$ ................................................. H04M 3/22
[52] U.S. Cl. ........................... 379/372; 379/80; 379/265; 379/386
[58] Field of Search .................. 379/67, 69, 80, 379/88, 89, 351, 372, 386, 265, 266, 309

[56] References Cited

U.S. PATENT DOCUMENTS

| | | | |
|---|---|---|---|
| 3,864,520 | 2/1975 | Owen | 395/2.56 |
| 4,296,277 | 10/1981 | Daneffel | 379/80 |
| 4,371,751 | 2/1983 | Hilligoss, Jr. et al. | 379/41 |
| 4,438,296 | 3/1984 | Smith | 379/69 |
| 4,492,820 | 1/1985 | Kennard et al. | 379/46 |
| 4,577,062 | 3/1986 | Hilleary et al. | 379/88 |
| 4,627,047 | 12/1986 | Pitroda | 370/68.1 |
| 4,742,537 | 5/1988 | Jesurum | 379/351 |
| 4,764,966 | 8/1988 | Einkauf et al. | 381/46 |
| 4,809,272 | 2/1989 | Torgrim | 370/110.3 |
| 4,881,261 | 11/1989 | Oliphant | 379/215 |
| 4,922,520 | 5/1990 | Bernard et al. | 379/88 |
| 4,941,168 | 7/1990 | Kelly, Jr. | 379/69 |
| 4,979,214 | 12/1990 | Hamilton | 381/46 |
| 5,127,004 | 6/1992 | Lenihan | 370/110.2 |
| 5,140,611 | 8/1992 | Jones | 375/219 |
| 5,268,903 | 12/1993 | Jones | 370/110.1 |
| 5,371,787 | 12/1994 | Hamilton | 379/386 |
| 5,430,792 | 7/1995 | Jesurum et al. | 379/67 |

FOREIGN PATENT DOCUMENTS

| | | |
|---|---|---|
| 62-283755 | 12/1987 | Japan . |
| 63-226163 | 9/1988 | Japan . |
| 1-133455 | 5/1989 | Japan . |
| 2 277 848 | 9/1994 | United Kingdom . |
| 9208309 | 5/1992 | WIPO ........................ 379/88 |

OTHER PUBLICATIONS

*Error Reduction Method for a Digital Signal Processing Voice and Audible Telephone Ring Tone Detection Algorithm*, IBM Technical Disclosure Bulletin, vol. 28, No. 9, pp. 4059–4060, Feb., 1986.

"Error Reduction Method for a Digital Signal Processing Voice and Audible Telephone Ring Tone Detection Algorithm", IBM Technical Disclosure Bulletin, vol. 28, No. 9, Feb. 1986 pp. 4059–4060.

*Primary Examiner*—Krista Zele
*Assistant Examiner*—Scott L. Weaver
*Attorney, Agent, or Firm*—Welsh & Katz, Ltd.

[57] ABSTRACT

An automatic call distributor (10) having a multiport switch (12) controlled by a central control processing unit (14) and an associated memory (16) for receipt of audio voice energy from answered telephonic calls through an external telephonic public switching network (22) to selectively connect the answered calls with internal telephonic units (18) coupled with the multiport switch (12) provided with a digital signal processing circuit card (30) for determining the presence of an answering machine (24) by running a pause timer and a delay timer which disables execution of the pause timer to establish a first minimum time period that an initial pause in the received voice energy from an external telephonic unit (20) must exceed to indicate the presence of a live voice in which the pause timer is disabled from timing any pauses until the end of a delay time internal, a second minimum time period which is no longer than the first minimum time period that a pause must exceed after the lapse of the delay time interval and detecting a live voice upon lapse of the first time period before the end of the initial pause or lapse of the second time period before the end of any pause after the initially measured pause.

11 Claims, 5 Drawing Sheets

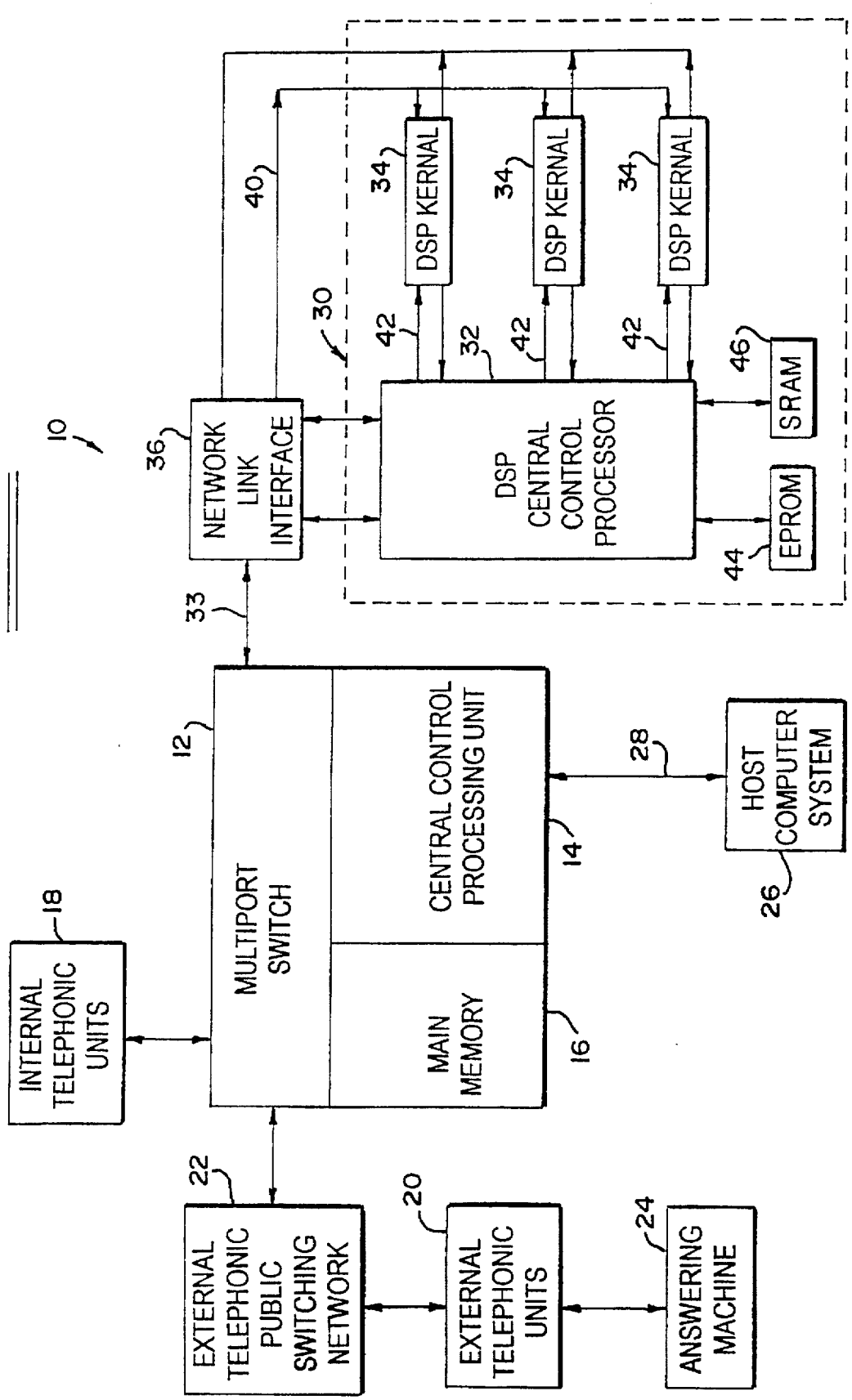

AUTOMATIC CALL DISTRIBUTION WITH ANSWER MACHINE DETECTION APPARATUS AND METHOD

This application is a continuation of application Ser. No. 08/313,973, filed Sep. 28, 1994, now abandoned.

BACKGROUND OF THE INVENTION

1. Field of the Invention

This invention relates generally to the field of telecommunication systems and, more particularly, to a telecommunication system with an automatic call distributor having a call answering detection device to distinguish between recorded and nonrecorded voice at an external telephonic unit upon an outdial call connection initiated from the automatic call distributor.

2. Description of the Related Art including Information Disclosed under 37 C.F.R. §1.97–1.99

Telecommunication systems employing an automatic call distributor having a multiport switch controlled by a central control processing unit in conjunction with a main memory for selectively interconnecting telephone calls received from external telephonic units of an external telephonic switching network are well known. Examples of such telecommunication systems are shown in examples of such call distributor systems as shown in U.S. Pat. No. 5,268,903 of Jones et al. entitled "Multichannel Telephonic Switching Network With Different Signaling Formats and Connect/PBX Treatment Selectable For Each Channel", issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

It is also known in such systems to automatically and predictively outdial calls from the automatic call distributor for answer at the external telephonic units of the external telephonic network. A predictive out-dialing algorithm is often employed to pace the out-dialing of calls from the call distributor for receipt at the external telephonic units. Telecommunication systems having such predictive out-dialing features can be seen in U.S. Pat. No. 4,881,261 of Oliphant et al., entitled "Method For Predictive Pacing of Calls in a Calling System", issued Nov. 14, 1989.

In such systems which out-dial calls from a call distributor to external telephonic units, it is known to employ answer detectors to determine when an out-dialed call is answered at an external unit. Additionally, such answer detectors determine if the answered call is nonrecorded voice, thus being a "live voice" answer, or if the answered call is a recorded voice, thus most likely being an answering machine. Known answer detectors differentiate between nonrecorded live voice and recorded answering machine voice upon the connection of a call at an external telephonic unit. If the answer detector determines that an answering machine has answered the out-dialed call, then the call is not routed to an agent at an internal telephonic unit of the system. In an automatic call distribution environment it is important to efficiently route only the calls which are answered by a live person to agents servicing the calls. Calls answered by recording machines at the external units which are inadvertently connected to agents significantly reduces the call servicing efficiency of the agents.

It is known in such answer detector devices to employ separate timers to differentiate live nonrecorded voice and recorded answering machines when calls are answered at external telephonic units. A long pause typically exists after the initial greeting word is detected for nonrecorded live answers by a person at an external unit. A rather short pause sometimes occurs from the initial voice sound to subsequent detected voice, often providing the caller instructions about leaving a message, when an answering machine connects with a call. In such known answer detectors a first timer, called a greeting timer, is initiated for a preselected period of time once initial voice energy is detected when a call is answered. A second timer, called a pause timer, is initiated when there is an absence of voice energy and runs for a preselected pause time period after the initial voice is detected. If there is no pause, or the pause time from the initial voice detection is less than the preselected pause time period, then the pause timer does not expire, and the greeting timer will expire first. An expiration of the pause timer before the greeting timer indicates that a sufficiently long pause has occurred and that a live nonrecorded human voice is detected. If the greeting timer expires before the pause timer, then the length of a pause has not met the preselected period of time, and, thus, an answering machine is determined to be present.

Disadvantageously, the two timer approach of such known answer detectors does not adequately detect the presence of an answering machine having a recorded message which has a rather long initial pause. Many answering machine messages have pause times after the initial voice greeting which exceed the starting time of a pause timer in the known answer detectors. Unfortunately, calls answered by these types of recorded messages at answering machines are often incorrectly identified as live nonrecorded voice. The calls are subsequently routed to agents at internal telephonic units who cannot adequately service out-dial calls connected externally to an answering machine.

Another disadvantage of such known answer detector devices is that they require a sufficiently long preselected pause time periods to detect the presence of an answering machine. Such extended time values required to make the distinction between live voice and recorded voice slows down the overall call handling efficiency at the automatic call distributor.

SUMMARY OF THE INVENTION

It is therefore a principal object of the present invention to provide an automatic call distributor with an answer machine detection apparatus and method in which the disadvantages of known call answering detection devices noted above are overcome by providing means and methods for accurately detecting the presence of answering machines with long initial greeting pauses.

The object is achieved by providing an automatic call distributor having a multiport switch controlled by a central control processing unit and an associated memory for receipt of audio voice energy from answered telephonic calls through an external telephonic public switching network and to selectively connect said answered calls with internal telephonic units coupled with the multiport switch, with an answer machine detection apparatus comprising means for establishing first minimum time period that an initial pause in the received voice energy must exceed to indicate the presence of a live voice including a delay timer for establishing a preselected maximum delay time interval beginning when voice energy is initially detected, a pause timer for establishing a preselected pause time period, and means for disabling the pause timer from beginning timing in response to any pause until lapse of the end of the preselected maximum delay time interval, means for establishing a second minimum time period no longer than the first minimum delay time interval to indicate the presence of live voice including means for enabling the pause timer to start timing the pause after the lapse of the delay time interval, and means responsive to lapse of the first minimum time period before the end of the initial pause or lapse of the second minimum time period before the end of any pause after the initial pause to indicate detection of live voice.

The object is also achieved by a method for detecting the presence of an answer machine in an automatic call distributor having a multiport switch controlled by a central control processing unit and an associated memory for receipt of audio voice energy from answered telephonic calls through an external telephonic public switching network and to selectively connect said answered calls with internal telephonic units coupled with the multiport switch, comprising the steps of (a) establishing a first minimum time period that an initial pause in the received voice energy must exceed to indicate the presence of a live voice including a delay timer for establishing a preselected maximum delay time interval beginning when voice energy is initially detected, a pause timer for establishing a second minimum time period, and disabling the pause timer from beginning timing in response to any pause until lapse of the end of the preselected maximum delay time interval, establishing a second minimum time period no longer than the first minimum time period that a pause must exceed after the lapse of the preselected maximum delay time interval to indicate the presence of live voice including the step of enabling the pause timer to start timing the pause after the lapse of the delay time interval, and indicating detection of live voice in response to lapse of the first minimum time period before the end of the initial pause or lapse of the second minimum time period before the end of any pause after the initial pause.

BRIEF DESCRIPTION OF THE DRAWING

The foregoing objects and advantageous features of the invention will be explained in greater detail and others will be made apparent from the detailed description of the preferred embodiment of the present invention which is given with reference to the several figures of the drawing, in which:

FIG. 1 is a functional block diagram of the preferred embodiment of the automatic call distributor having the answer machine detection apparatus of the present invention as interconnected with a known external telephonic public switching network;

DESCRIPTION OF THE PREFERRED EMBODIMENT

Figure 2A:
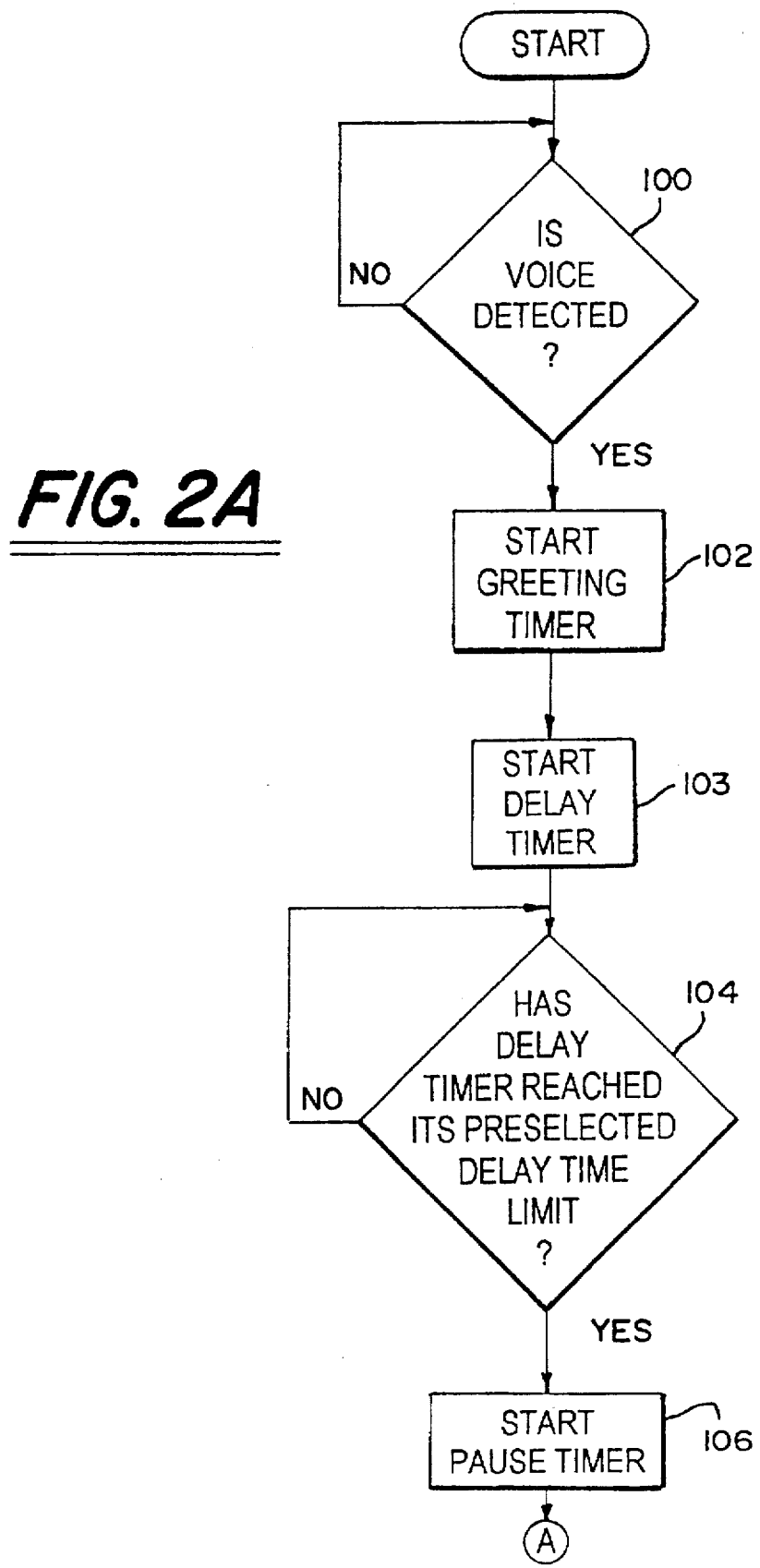
FIGS. 2A and 2B form a composite flow chart illustrating the procedural steps of the preferred answer machine detection program of the present invention.

Referring to FIG. 1, an automatic call distributor 10 is shown having a multiport switch 12 operating under the control of a central control processing unit 14 in conjunction with a main memory 16 to selectively interconnect telephonic calls between internal telephonic units 18 and external telephonic units 20 of an external telephonic public switching network 22. The telephonic calls are out-dialed from the automatic call distributor (ACD) 10 and are answered by a person at an external telephonic unit 20 or by an answering machine 24 coupled therewith. The out-dial call pacing campaigns are selectively initiated through employment of a remote host computer system 26 which transmits out-dial call information messages to the central control processing unit 14 of the ACD 10 over a transaction link interface 28. Preferably, a telephonic call answered by live, human nonrecorded voice at an external telephonic unit 20 is routed and connected by the switch 12 to an agent stationed at an internal telephonic unit 18 to service the call. Telephonic calls which are determined to be answered by the recorded voice of an answering machine 24 and accordingly dropped by the ACD 10 are not routed to the internal telephonic units.

In the preferred embodiment, the processing power for the central control unit 14 of the ACD 10 is provided by a thirty-two bit Motorola 68030 microprocessor. Generally, while an answer machine detection apparatus 30 of the present invention can be implemented in numerous types and sizes of telecommunication systems employing automatic call distributors, it is preferably employed in the call distribution system of the types shown in U.S. Pat. No. 5,268,903 of Jones et al. entitled "Multichannel Telephonic Switching Network With Different Signaling Formats and Connect/PBX Treatment Selectable For Each Channel", issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986. For further details of out-dial call pacing implemented through the remotely stationed host computer system 26, reference can be made to U.S. Pat. No. 4,881,261 of Oliphant et al. entitled "Method for Predictive Pacing of Calls in a Calling System", issued Nov. 14, 1989.

In accordance with the present invention, the answer machine detection apparatus is implemented in Digital Signal Processing (DSP) circuit card 30. The DSP 30 determines the presence of live nonrecorded voice at an external telephonic unit 20 and recorded voice from an answering machine 24 in response to an answered out-dialed call received at the multiport switch 12 of the ACD 10. The voice energy received through the external telephonic public switching network 22 is sent from the multiport switch 12 to the DSP circuit 30 to determine the presence of "live" voice or an answering machine. The determination is made through employment of a "greeting" timer which is initiated at the DSP circuit 30 when voice energy is first detected and through a "pause" timer running at the DSP circuit which times the pauses which follow the initial answered greeting. Preferably, the pause timer is reset every time voice energy is detected and measures elapsed time when voice energy is not present.

In addition to the greeting and pause timers, a third delay timer referred to as the pause enable tap timer operates at the digital signal processing circuit card 30. The delay timer is a tap on the greeting timer which prevents enablement of the pause timer for a preselected delay time after the initiation of the greeting timer. The pause timer, greeting timer and delay timer are all implemented through software registers that are incremented by real time interrupts occurring every 125 microseconds on the DSP circuit card 30.

A preselected time value is specified for the greeting timer, the pause timer and the delay timer. The pause timer is set, for example, to a value of 0.6 seconds, and the delay timer value is set for 0.7 seconds to allow a pause between the first and second words of an answered greeting for 1.3 seconds and a pause time of 0.6 seconds for the duration of the responded greeting. The implementation of the delay timer or the pause enable tap timer enables the preselected setting of the pause timer to be reduced while providing accurate detection of answering machine greetings which have long initial pauses. Accordingly, the ensuing reduction in the pause time results in the DSP circuit card 30 being enabled to quickly detect the presence of live nonrecorded voice thereby increasing the overall call servicing efficiency of the ACD 10. The software implementation of the greeting timer, pause timer and delay timer for the answer machine detection system of the present invention is performed at the digital signal processing circuit 30. The DSP circuit 30 operates under the control of a Motorola 68000 DSP central control microprocessor 32. The DSP central control microprocessor 32 is coupled with three DSP kernal processor circuits 34 and a network link interface circuit 36. Preferably the DSP kernal processor circuits are Texas Instruments Model TI TMS320C25 digital signal processing circuits. The three identical DSP kernal integrated circuits 34 operating at a twenty megahertz frequency provide the receiver capability of the DSP circuit card 30 by performing real time analysis of digital data received over a pulse code modulation (PCM) highway through the network link interface integrated circuit 36. The DSP circuit card 30 receives and transmits audio signals for up to twenty-four pulse code modulation voice channels and communicates to the central control processing unit 14 of the ACD 10 through a network link interface (NLI) application specific integrated circuit (ASIC) 36.

The NLI ASIC 36 splits the analog PCM channels from the control channel over single wire interface 33 received from the central control processing unit 14 through the employment of time division multiplexing. Each DSP kernal circuit 36 selectively accesses up to eight analog input and output channels serially encoded as sixty-four kilo-bits per second PCM channels. The control channel from the central control processing unit 14 is connected to the DSP central control processor 32 and a selected DSP kernal integrated circuit 34 which decodes control information from the central processing unit 14 received via the NLI ASIC 36 and routes the answer machine detection results obtained from the DSP kernal circuits 34 back to the ACD central processing unit 14. The software program for the answer machine detection is downloaded from the main memory 16 of the ACD 10 to the associated memory of the DSP kernal circuits 34 of the DSP circuit 30 when the DSP circuit 30 is initialized. The DSP kernal integrated circuits 34 communicate to the 68000 DSP central control processor 32 via handshaked I/O ports.

A call dialed from the ACD 10 is received and answered by an individual at an external telephonic unit 20 or its associated answering machine 24. The response to the telephonic call is in the form of an audio answer either from the individual speaking into the external telephonic unit telephone receiver or the answering machine playing a recorded audio message. The audio associated with the answer response to the call is routed via a pulse code modulation audio channel 40 to one of the three DSP kernal circuits 34. The twenty four PCM audio channels from the network link interface circuit 36 operating at sixty-four kilobits per second are separated through the employment of time division multiplexing. The central control processing unit 14 of the ACD 10 initializes a downloaded software program code at the DSP circuit 30 to analyze the audio answer for the presence of voice energy, and the DSP circuit subsequently reports the results of the analysis back to the ACD.

The DSP central control processor 32 operating from a forty megahertz clock provides the overall control of the DSP circuit card 30 functions. The DSP central control processor 32 communicates with the higher level central processing unit 14 of the ACD 10 over the NLI ASIC 36 and communicates with the DSP kernal circuits 34 via program control and response lines 42. The DSP central control processor 32 has an associated erasable programmable read only memory (EPROM) 44 for providing start-up diagnostic capabilities and boot loading. The functional code for the DSP circuit card 30 is downloaded from the main memory 16 associated with the central control processing unit 14 into a static random access memory (SRAM) 46 for temporary storage and subsequent execution at an associated DSP kernal integrated circuit 34.

The network link interface circuit 36 provides twenty-four PCM channels, a 768 kbit communication link and system clock and sync signals to the DSP circuit 30 from the multiport switch 12. Each digital signal processor kernal circuit 34 has multiplexed access to eight of the twenty-four channels accessed by the card DSP circuit 30 and provides receiver functions on its eight channels. Each DSP kernal circuit 34 operates from its own eight kilowords of program/data RAM which is downloaded upon initialization with the appropriate functional code by the DSP central control processor 32. For further details on the Digital Signal Processor circuit 30 and its operation, reference can be made to U.S. patent application Ser. No. 08/047,884, entitled "A Functional Programmable PCM Data Analyzer and Transmitter For Use In Telecommunication Equipment", of Lenihan et al., filed Apr. 15, 1993 now U.S. Pat. No. 5,454,981 incorporated herein by reference and assigned to the assignee of the present invention.

Figure 2B:
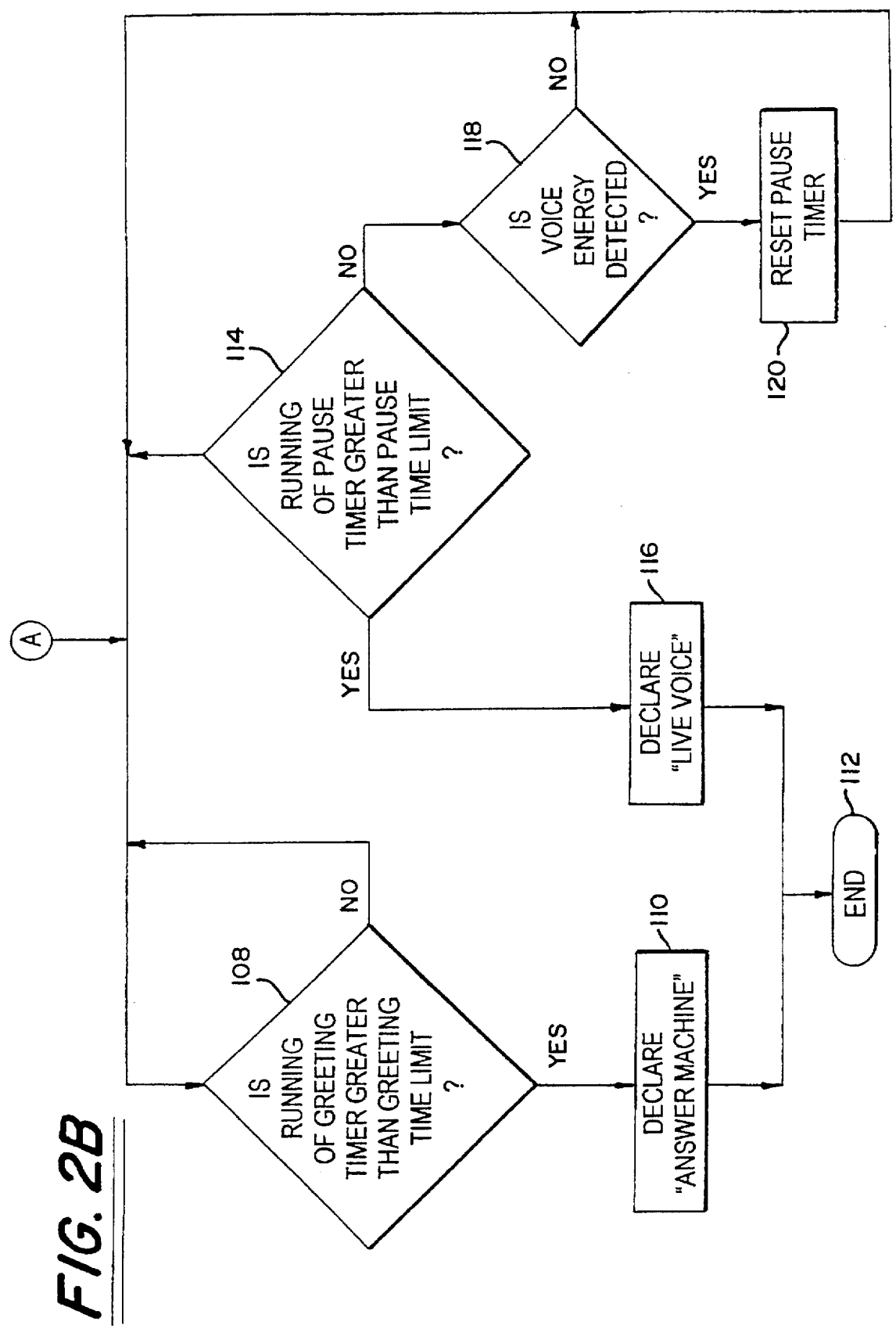

Referring now to FIGS. 2A and 2B, the procedural flow for the DSP software used for answering machine detection is initiated at step 100, FIG. 2A, by the DSP circuit 30 detecting voice energy (as differentiated from tone energy) from an outbound call connected at an external telephonic unit 20. If tone energy rather than voice energy is detected by the DSP circuit card 30, the processing does not begin until such voice energy detection is made. If the DSP circuit card 30 detects the presence of voice energy on a telephonic line for the call then in step 102, an initial greeting timer is activated. The greeting timer runs throughout the processing of the voice and answer machine detection software algorithm.

The initiation of the greeting timer also actuates the initiation of a preselected delay timer or pause enable tap on the greeting timer in step 103, FIG. 2A. The delay timer or pause enable tap is preferably set to have a preselected maximum delay time limit interval of 0.7 seconds. In step 104, the DSP circuit card 30 determines if the delay timer has reached its preselected delay time limit. If the total delay time is less than the preselected delay time limit, then the delay timer continues to run and disable activation of the pause timer. If the pause enable tap delay timer has timed out and reached its delay time limit, then in step 106, the pause timer is initiated. The expiration of the delay timer tap on the greeting timer thereby is used to enable the initiation of the pause timer. The pause and greeting timers are software registers that are incremented by real time interrupts of the DSP circuit card 30. Preferably, the real time interrupts incremented by the software registers of the DSP circuit 30 occur every 125 microseconds.

The DSP kernal processors 34 DSP circuit card 30 measure the absence of voice energy or pauses in the voice energy upon the detection of the voice of an answered out-dial call. The pauses in the voice energy received are timed by the pause timer. In response to the initiation of the pause timer, the DSP circuit card 30 determines if the running time of the greeting timer exceeds the preselected time limit for the greeting timer in step 108. If the preselected greeting time limit also called preselected greeting time period is less than the actual running time of the greeting timer, then the greeting timer continues to run. If the running time of the greeting timer is greater than the preselected greeting time limit, then in step 110, the DSP circuit 30 determines that the received voice energy is sent from an answering machine 24. The DSP central control microprocessor 32 of the DSP circuit 30 sends an indication to the automatic call distributor 10 that the call was answered by an answering machine 24. In step 112, the answering machine detection processing ends.

In response to the initiation of the pause timer, the selected DSP kernal circuit 34 of the DSP circuit 30 determines if the active running of the pause timer is greater than a preselected pause time limit in step 114. If the running of the pause timer is greater than the preselected pause time limit, then in step 116, the DSP circuit 30 determines that the measured voice energy is a live voice. Preferably, the out-dialed telephonic call which is answered by the live voice of a person is immediately distributed and connected to an internal telephonic unit 18 for servicing by an agent. The processing flow ends at step 112 upon the detection of live nonrecorded voice energy. If the running of the pause timer is less than the preselected pause time limit, then in step 118, the DSP circuit 30 determines if there is the presence of voice energy on the calling line. If there is no detection of voice energy then the pause timer continues to run until the presence of voice energy is sensed. If the presence of voice energy is detected, then in step 120, the pause timer is reset.

Preferably, when the detected voice energy falls below a preselected relative threshold level representing the absence of voice energy, the pause timer is enabled and begins to run. When the presence of voice energy is again detected during pause timer execution, the pause timer is held at reset, thereby being disabled. The determination of live nonrecorded voice energy or recorded answering machine recorded voice energy is based on which timer (i.e. greeting timer or pause timer) times-out first. If the greeting timer exceeds the greeting timer limit, as seen in step 110, the voice answer detected is declared to be received from an answer machine. Preferably the greeting timer limit is preselected at approximately 2.5 to 3.2 seconds. If the pause timer exceeds the pause timer limit, as seen in step 116, the voice answer detected is declared to be a live, nonrecorded voice response. The settings for the pause enable tap on the greeting timer, the greeting timer limit and the pause timer limit are imperically determined by evaluation of a sufficiently large quantity of live voice and recorded answer machine responses to outbound telephone calls.

Figure 3:
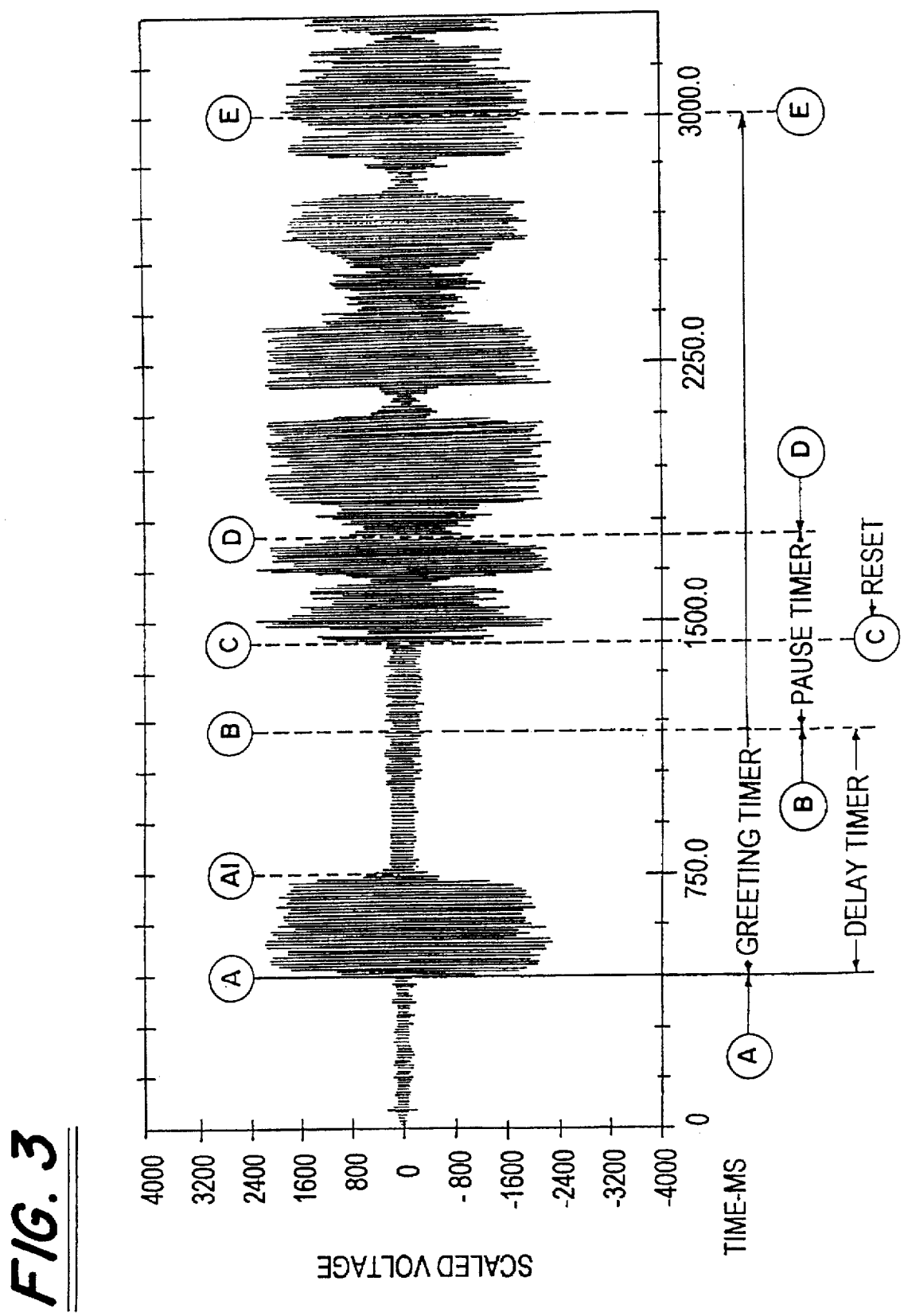
FIG. 3 is a voice timing diagram chart of the present invention illustrating audio voice energy signals detected from an answering machine.

Referring now to FIG. 3, a voice timing diagram chart for an answer machine is shown having audio voice energy being detected at time A of approximately 450 milliseconds. At this time A the running of the greeting timer having a preselected greeting time limit, for example 2.55 seconds, is initiated. The greeting timer continuously runs until its associated greeting time limit of 2.55 seconds expires at approximately 3.0 seconds. At the 450 millisecond time of time A, the pause enable tap timer is started for a preselected maximum delay time. Preferably, the preselected delay time is set for approximately 0.7 seconds and thus times-out at approximately 1.15 seconds, at time B of FIG. 3. The activation of the delay timer disables or prevents enablement of the pause timer until the delay timer has timed-out the preselected delay time limit. Therefore, even though a pause exists prior to time B of FIG. 3, the delay timer prevents the starting of the pause timer to measure the preselected pause time limit for a determination of live voice.

The pause timer is not activated until time B (approximately 1.15 seconds). Preferably, the preselected pause timer limit is set to approximately 0.6 seconds. If the preselected pause time limit expires prior to the longer preselected greeting time limit, then the presence of live human voice is established. Conversely, if the preselected greeting time limit which is greater than the pause time limit expires prior to the pause time limit, then the DSP circuit determines that the voice energy is received from an answering machine. Since the pause timer limit is set for 0.6 seconds, and the pause timer is initiated a time B (at 1.15 seconds), the pause timer will expire at approximately 1.75 seconds of time D of FIG. 3. However, if voice energy is detected, as seen at time C of FIG. 3 during the running of the pause timer, then the DSP circuit automatically resets the pause timer, and the pause timer is not activated until a subsequent pause in voice energy is detected. Therefore, the pause timer does not reach its preselected pause timer limit at time D since the pause timer is reset at time C. In FIG. 3 the pause timer does not detect a pause in voice energy for a time period meeting the threshold level of the preselected pause time limit prior to the expiration of the greeting timer at time E, and thus the DSP circuit 30 detects the presence of an answering machine from the received audio voice energy.

Figure 4:
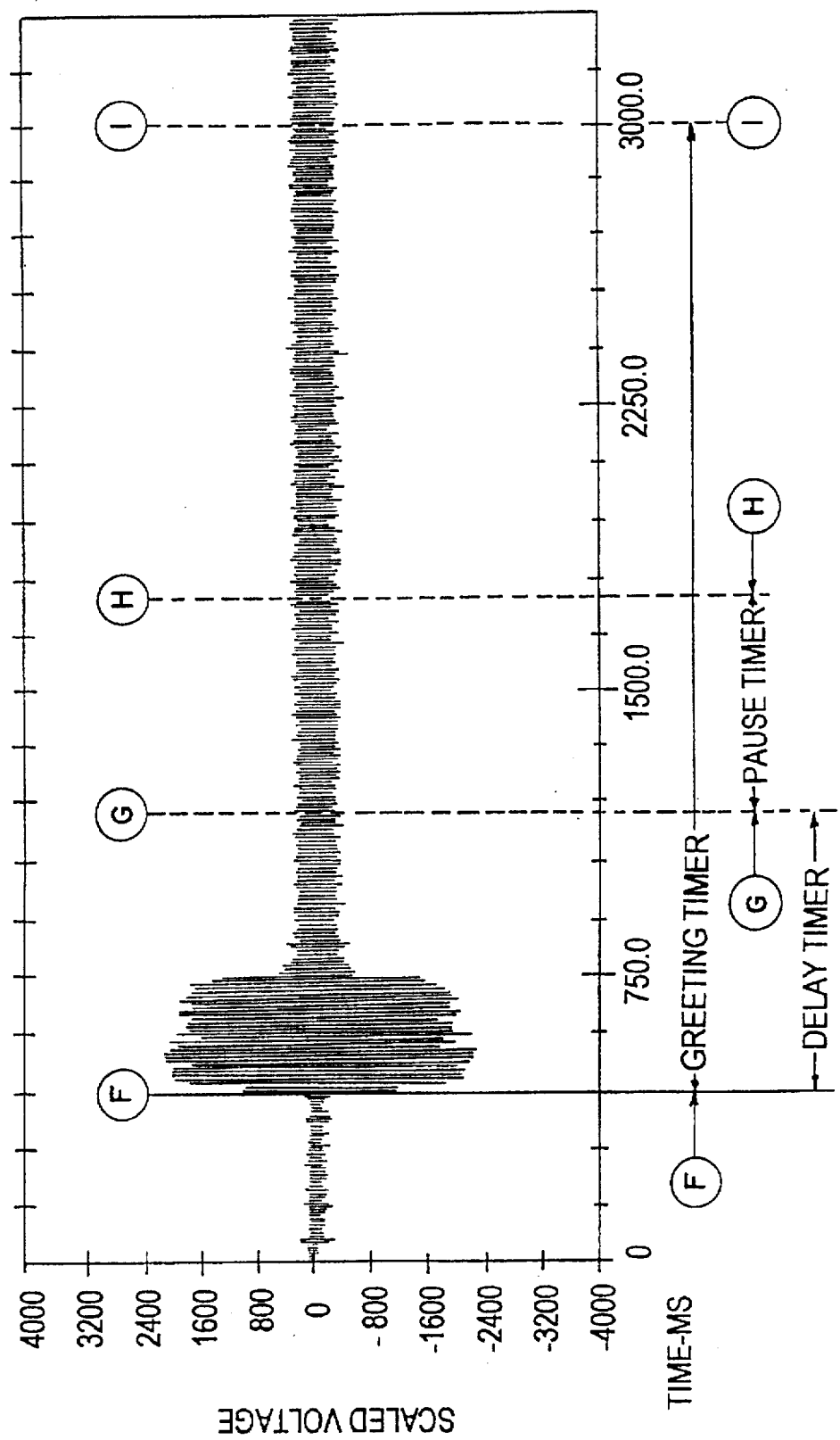
FIG. 4 is a voice timing diagram chart of the present invention illustrating audio voice energy signals detected from a live voice.

It is seen in FIGS. 3 and 4 that a first minimum time period is established for the initially measured pause (at time A1 in FIG. 3) in the voice energy which must be exceeded to indicate the presence of a live voice. In FIG. 4 the initial pause, measured after voice energy is initially detected, continues beyond the lapse of the delay timer and further beyond the lapse of the pause timer thereby indicating a live voice. The delay timer establishes a preselected maximum delay time interval, preferably for 0.7 seconds, whereby the delay timer is activated when voice energy is initially detected, as seen at times A and F. The pause timer is disabled from beginning until the timing of any pause until the preselected maximum delay time interval has ended and has lapsed, as seen at times B and G. Upon an initially detected pause, the first minimum time period is preferably equal to the pause time period plus the reminder of the preselected maximum delay time interval.

After the expiration of the delay timer which results in lapse of the preselected maximum delay time interval, a second minimum delay time period which is no longer than the first minimum time period is established. After the preselected maximum delay time has lapsed (as seen at times B and G) the pause timer is enabled to start timing pauses in order to find an indication of a live voice. Preferably, the preselected pause time period for the pause timer is equal to the second minimum time period and is set for 0.6 seconds. If the pause timer times out after measuring any pause after the lapse of the delay time interval a finding of a live voice is determined. A lapse of the first minimum time period before the end of the initial pause, as seen in FIG. 4, indicates a detection of a live voice. Furthermore, a lapse of the second minimum time period before the end of any other pause after the initially measured pause, thereby also enabling the pause timer to timeout, also indicates a detection of a live voice.

The voice energy signals detected from times A to A1 of FIG. 3 illustrate a voice saying "Hello" from an answering machine. From time A1 to time C of FIG. 3, a pause or absence of voice energy is shown. Beyond time C voice energy in the form of a spoken message such as "we are not available right now" from an answering machine is illustrated. The DSP circuit 30 of the present invention is enabled to accurately detect the presence of an answer machine with a relatively long pause after the initial greeting.

Referring now to FIG. 4, a voice timing diagram chart for a live voice is shown having the initial detection of audio voice energy at time F of approximately 0.45 seconds. At time F, the greeting timer is set to run for a preselected greeting time limit of approximately 2.55 seconds until it expires at time I. The running of the delay timer is also activated upon the initial detection of voice energy at time F. The delay timer has a preselected maximum delay time which prevents enablement of the pause timer until the delay timer times-out at time G. The pause timer, having a preselected pause time limit of 0.6 seconds, expires at time H. Since the detected pause (i.e. absence of minimal threshold for audio voice energy) is continuous from time G to time H, the pause timer is not reset and expires prior to the greeting timer at time H. The expiration of the pause timer prior to the greeting timer indicates the presence of a live nonrecorded voice as opposed to a recorded voice from an answer machine.

While a detailed description of the preferred embodiment of the invention has been given, it should be appreciated that many variations can be made thereto without departing from the scope of the invention as set forth in the appended claims.

I claim:

1. In an automatic call distributor having a multiport switch controlled by a central control processing unit and an associated memory for receipt of voice energy from answered telephonic calls through an external telephonic public switching network and to selectively connect said answered calls with internal telephonic units coupled with the multiport switch, the improvement being an answer machine detection apparatus comprising:

means for establishing a first minimum time period that an initial pause in the received voice energy must exceed to indicate the presence of a live voice including a delay timer for establishing a preselected maximum delay time interval beginning when the received voice energy is initially detected, a pause timer for establishing a preselected pause time period, and means for disabling the pause timer from beginning timing in response to any pause until lapse of the end of the preselected maximum delay time interval;

means for establishing a second minimum time period no longer than the first minimum time period that a pause must exceed after the lapse of the preselected maximum delay time interval to indicate the presence of live voice including means for enabling the pause timer to start timing any pause after the lapse of the delay time interval; and means responsive to lapse of the second minimum time period before the end of any pause to indicate detection of live voice.

2. The answer machine detection apparatus of claim 1 including a greeting timer having a preselected greeting time period in which the preselected greeting time period is longer than the preselected maximum delay time interval, and means for initiating the running of the greeting timer in response to the initial detection of the received voice energy.

3. The answer machine detection apparatus of claim 2 including means for activating the delay timer to prevent enablement of the pause timer for the preselected maximum delay time interval upon the initiation of the greeting timer.

4. The answer machine detection apparatus of claim 2 in which said preselected greeting time period is greater than said preselected pause time period and including means for determining the expiration of the greeting timer reaching the preselected greeting time period, means for determining the expiration of the pause timer reaching the preselected pause time period, means for detecting the expiration of the greeting timer prior to expiration of the pause timer, and means responsive to the expiration detection means for establishing the presence of an answer machine upon the greeting timer expiring prior to the pause timer.

5. The answer machine detection apparatus of claim 4 including means for resetting the pause timer in response to a subsequent detection of subsequent voice energy prior to the expiration of the preselected pause time period.

6. The answer machine detection apparatus of claim 5 including a digital signal processing circuit coupled with the multiport switch in which the digital signal processing circuit has a plurality of kernal processing circuits which receive the voice energy serially encoded on pulse code modulation channels to distinguish between the presence of live voice and recorded voice from answering machine.

7. In an automatic call distributor having a multiport switch controlled by a central control processing unit and an associated memory for receipt of audio voice energy from answered telephonic calls through an external telephonic public switching network and to selectively connect said answered calls with internal telephonic units coupled with the multiport switch, the improvement being a method for detecting an answer machine, comprising the steps of:

establishing a first minimum time period that an initial pause in the received voice energy must exceed to indicate the presence of a live voice including a delay timer for establishing a preselected maximum delay time interval beginning when the received voice energy is initially detected, a pause timer for establishing a preselected pause time period, and disabling the pause timer from beginning timing in response to any pause until lapse of the end of the preselected maximum delay time interval;

establishing a second minimum time period no longer than the first minimum time period that a pause must exceed after the lapse of the preselected maximum delay time interval to indicate the presence of live voice including the step of enabling the pause timer to start timing any pause after the lapse of the delay time interval; and indicating detection of live voice in response to lapse of the second minimum time period before the end of any pause.

8. The method of claim 7 including the step of initiating the running of a greeting timer having a preselected greeting time period which is longer than the preselected maximum delay time interval in response to the initial detection of the received voice energy.

9. The method of claim 8 including the step of activating the delay timer to prevent enablement of the pause timer for the preselected maximum delay time interval upon the initiation of the greeting timer.

10. The method of claim 8 in which said preselected greeting time period is greater than said preselected pause time period and including the steps of determining the expiration of the greeting timer reaching the preselected greeting time period, determining the expiration of the pause timer reaching the preselected pause time period, detecting the expiration of the greeting timer prior to expiration of the pause timer, and establishing the presence of an answer machine upon the greeting timer expiring prior to the pause timer.

11. The method of claim 10 including the step of resetting the pause timer in response to a subsequent detection of subsequent voice energy prior to the expiration of the preselected pause time period.

* * * * *